United States Patent [19]

Herrington, Jr.

[11] Patent Number: 5,780,067

[45] Date of Patent: Jul. 14, 1998

[54] ADJUSTABLE COEXTRUSION FEEDBLOCK

[75] Inventor: F. John Herrington, Jr., Bloomfield, N.Y.

[73] Assignee: Extrusion Dies, Inc., Chippewa Falls, Wis.

[21] Appl. No.: 711,554

[22] Filed: Sep. 10, 1996

[51] Int. Cl.⁶ .................................................. B29C 47/06
[52] U.S. Cl. ............... 425/131.1; 264/40.7; 264/173.12; 264/173.16; 425/133.5; 425/141; 425/145; 425/382.4; 425/462
[58] Field of Search .................. 425/141, 145, 425/146, 130, 131.1, 132, 133.5, 382.4, 462, 465, 466; 264/40.7, 173.12, 173.16, 173.17, 177.16

[56] References Cited

U.S. PATENT DOCUMENTS

| | | | |
|---|---|---|---|
| 3,003,245 | 10/1961 | Nunez, Jr. | 425/382.4 |
| 3,032,008 | 5/1962 | Land et al. | 118/411 |
| 3,097,058 | 7/1963 | Branscum et al. | |
| 3,223,761 | 12/1965 | Raley | |
| 3,397,428 | 8/1968 | Donald | |
| 3,443,277 | 5/1969 | Frielingsdorf | |
| 3,448,183 | 6/1969 | Chisholm | 264/37 |
| 3,479,425 | 11/1969 | Lefevre et al. | |
| 3,504,402 | 4/1970 | Wetz et al. | |
| 3,557,265 | 1/1971 | Chisholm et al. | |
| 3,583,032 | 6/1971 | Stafford | |
| 3,587,281 | 6/1971 | Lemelson | 72/265 |
| 3,761,211 | 9/1973 | Parkinson | |
| 3,807,918 | 4/1974 | Chill et al. | |
| 3,830,610 | 8/1974 | Ohkawa et al. | 425/141 |
| 3,860,372 | 1/1975 | Newman, Jr. | 425/133.1 |
| 3,909,170 | 9/1975 | Riboulet et al. | 425/133.5 |
| 3,927,957 | 12/1975 | Chill et al. | 425/131.1 |
| 4,152,387 | 5/1979 | Cloeren | |
| 4,171,195 | 10/1979 | Klein et al. | 425/141 |
| 4,189,292 | 2/1980 | Hureau et al. | 425/290 |
| 4,197,069 | 4/1980 | Cloeren | 425/131.1 |
| 4,285,655 | 8/1981 | Matsubara | 425/461 |
| 4,289,560 | 9/1981 | Simons | 156/244.18 |
| 4,295,812 | 10/1981 | Hoddinott | 425/114 |
| 4,405,547 | 9/1983 | Koch et al. | |
| 4,422,839 | 12/1983 | Przytulla et al. | 425/465 |
| 4,435,141 | 3/1984 | Weisner et al. | 425/131.1 |
| 4,439,125 | 3/1984 | Dieckmann et al. | 425/382.4 |
| 4,443,397 | 4/1984 | Hahn et al. | |
| 4,470,790 | 9/1984 | Harada et al. | 425/466 |
| 4,483,669 | 11/1984 | Hahn et al. | 425/131.1 |
| 4,483,812 | 11/1984 | Hahn et al. | |
| 4,521,359 | 6/1985 | Tsien | 264/104 |
| 4,524,099 | 6/1985 | Di Luccio | 428/213 |
| 4,533,308 | 8/1985 | Cloeren | 425/131.1 |
| 4,533,510 | 8/1985 | Nissel | |
| 4,562,023 | 12/1985 | Pabst et al. | 264/74 |

(List continued on next page.)

FOREIGN PATENT DOCUMENTS

| | | |
|---|---|---|
| 26 29 333 A | 1/1978 | Germany |
| 28 51 930 A | 6/1980 | Germany |
| 55-28855 | 2/1980 | Japan |
| 56-125 | 1/1981 | Japan |
| 58-209529 | 12/1983 | Japan |
| 59-220332 | 12/1984 | Japan |
| 61-89823 | 5/1986 | Japan |
| 61-270114 | 11/1986 | Japan ........................ 425/382.4 |
| 62-264925 | 11/1987 | Japan |
| 397357 | 1/1974 | U.S.S.R. |

OTHER PUBLICATIONS

Drawings from the Davis Standard Company showing a feedblock design, circa 1983.

*Primary Examiner*—Jay H. Woo
*Assistant Examiner*—Joseph Leyson
*Attorney, Agent, or Firm*—Marshall, O'Toole, Gerstein, Murray & Borun

[57] ABSTRACT

A feedblock for coextrusion apparatus permits profile adjustment of individual layers through the use of flow tuning valves that extend across the width of a main flow through the feedblock.

28 Claims, 13 Drawing Sheets

U.S. PATENT DOCUMENTS

| | | |
|---|---|---|
| 4,579,696 | 4/1986 | Di Luccio . |
| 4,600,550 | 7/1986 | Clören . |
| 4,619,802 | 10/1986 | Cloeren . |
| 4,652,225 | 3/1987 | Dehennau et al. .................... 425/133.1 |
| 4,669,965 | 6/1987 | Murakami ............................. 425/133.5 |
| 4,695,236 | 9/1987 | Predöhl et al. ....................... 425/131.1 |
| 4,708,618 | 11/1987 | Reifenhäuser et al. .............. 425/133.5 |
| 4,756,858 | 7/1988 | Reifenhäuser et al. .................... 264/37 |
| 4,780,258 | 10/1988 | Cloeren . |
| 4,789,513 | 12/1988 | Cloeren . |
| 4,880,370 | 11/1989 | Krumm ................................. 425/133.5 |
| 4,911,628 | 3/1990 | Heilmayr et al. .................... 425/131.1 |
| 5,020,984 | 6/1991 | Cloeren et al. .......................... 425/141 |
| 5,066,435 | 11/1991 | Lorenz et al. .......................... 264/40.5 |
| 5,066,443 | 11/1991 | Cloeren . |
| 5,094,788 | 3/1992 | Schrenk et al. . |
| 5,094,793 | 3/1992 | Schrenk et al. . |
| 5,102,323 | 4/1992 | Blemberg ............................. 425/133.5 |
| 5,110,276 | 5/1992 | Farnsworth et al. ................. 425/133.1 |
| 5,120,484 | 6/1992 | Cloeren . |
| 5,122,905 | 6/1992 | Wheatley et al. ......................... 359/586 |
| 5,122,906 | 6/1992 | Wheatley ................................. 359/586 |
| 5,126,880 | 6/1992 | Wheatley et al. ......................... 359/587 |
| 5,137,675 | 8/1992 | Rabe . |
| 5,147,195 | 9/1992 | Cloeren ................................. 425/133.5 |
| 5,211,898 | 5/1993 | Shinmoto . |
| 5,269,995 | 12/1993 | Ramanathan et al. . |
| 5,375,990 | 12/1994 | Krupa et al. .......................... 425/133.5 |
| 5,489,402 | 2/1996 | Knoblauch et al. .................. 425/133.5 |

ADJUSTABLE COEXTRUSION FEEDBLOCK

TECHNICAL FIELD

The present invention relates generally to flow control devices, and more particularly to a feedblock for coextrusion apparatus.

BACKGROUND ART

Sheets or webs of a material are often formed using an extrusion process. For example, a thermoplastic may be heated and extruded through a die to form a sheet of desired thickness. At times, it may be desired to coextrude two or more different materials to form a laminate. This has been accomplished in the past through the use of multi-manifold dies or by combining the flows of the materials upstream of a single manifold die. In the latter case, a feedblock is coupled between two or more extruders and the die and combines the flows of the various materials.

One difficulty encountered when using a feedblock to accomplish coextrusion is that the relative layer thicknesses of the final extrudate is affected by flow through the die passages, resulting in layer thickness that may not be uniform across the width of the die. It would be desirable to effect compensating profile adjustments to the individual layers in the feedblock rather than in the die.

However, there is no outlet lip gap to adjust in a feedblock and the dimensions of the feedblock passage just upstream from the outlet render the use of one or more restrictor bars at such location impractical because, by necessity, such a restrictor bar would have a cross-section which is too large to permit the restrictor bar to be deflected locally.

SUMMARY OF THE INVENTION

A feedblock for coextrusion apparatus allows for ready adjustment of flow of thicknesses across the width of a thermoplastic flow so that film thickness uniformity can be achieved.

More particularly, in accordance with one aspect of the present invention, a feedblock includes a main passage having a length extending from a first inlet toward an outlet and having a width transverse to the length and a plurality of intercommunicating auxiliary passages converging with the main passage on one side thereof at a series of openings arranged across the width of the main passage. Flow adjustment apparatus is disposed in the auxiliary passages.

Preferably, the flow adjustment apparatus comprises a plurality of valve rods each disposed in an associated auxiliary passage and axially movable to change flow resistance therein. Also preferably, each valve rod has a cross-sectional configuration matching a cross-sectional configuration of the respective passage. In a specific embodiment, each valve rod and each auxiliary passage is circular in cross-section. Further, each valve rod may be axially displaceable in the associated auxiliary passage and each valve rod may have a cross-sectional size smaller than a cross-sectional size of the associated auxiliary passage. Still further, each valve rod may be tapered.

Still further, the auxiliary passages may overlap over a full length thereof or for only a portion of the full length thereof and may be tapered. Alternatively, the auxiliary passages may be interconnected by a slot over the full length thereof. The auxiliary passages may further be inclined relative to one another.

In accordance with a further aspect of the present invention, a feedblock includes a first passage extending toward an outlet, a second passage converging with the first passage at a first convergence point on one side of the first passage and a third passage overlapping with the second passage and converging with the first passage at a second convergence point on the one side of the first passage laterally offset from the first convergence point. First and second valve rods are disposed in the second and third passages, respectively, wherein at least one of the valve rods is moveable in the respective passage to change flow resistance therein.

Other features and advantages are inherent in the apparatus claimed and disclosed or will become apparent to those skilled in the art from the following detailed description in conjunction with the accompanying drawings.

DESCRIPTION OF THE PREFERRED EMBODIMENTS

Figure 1:
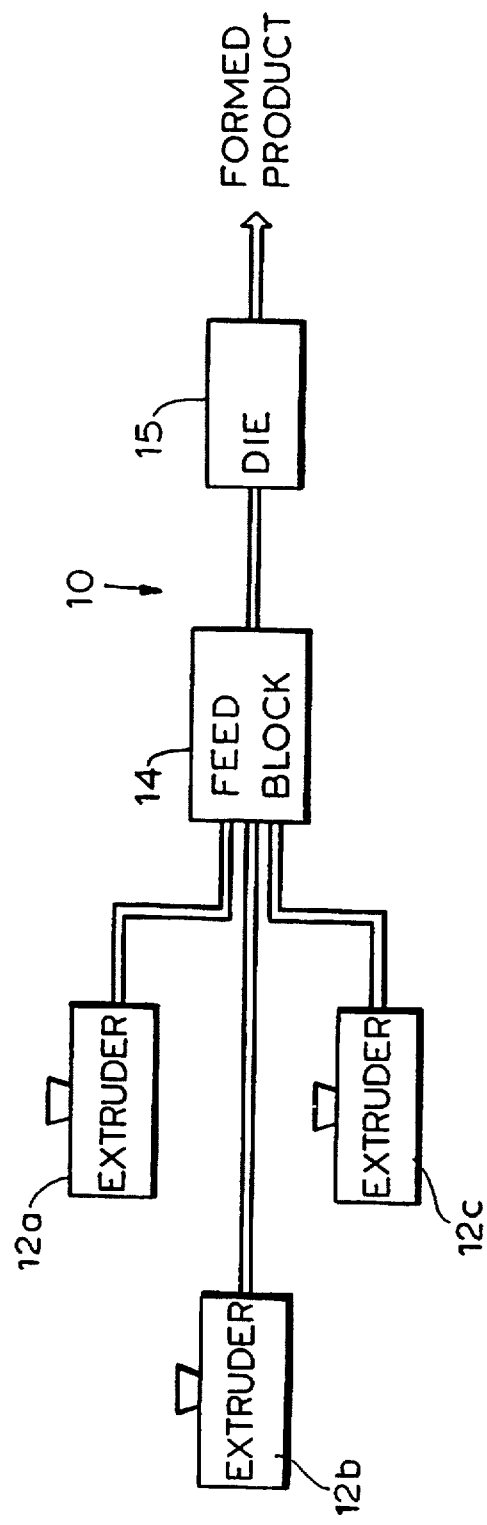
FIG. 1 comprises a block diagram of coextrusion apparatus including a feedblock according to the present invention.

Referring first to FIG. 1, a coextrusion apparatus 10 includes a plurality of extruders 12a, 12b, 12c, each of which may extrude a flowable material, such as a thermoplastic, into a feedblock 14 according to the present invention. The materials extruded by the extruders 12a–12c may all be different or some or all may be identical, as desired. While three extruders 12a–12c are shown as being connected to the feedblock 14, it should be noted that with suitable modifications to the feedblock 14, any other number of extruders might alternatively be connected thereto. The feedblock 14 combines the single extrusion flows from at least two of the extruders 12a–12c into a coextrusion flow which is, in turn, provided to a die 15. The die 15 forms the coextruded materials into a desired form, such as a sheet, web or coating.

Figure 2:
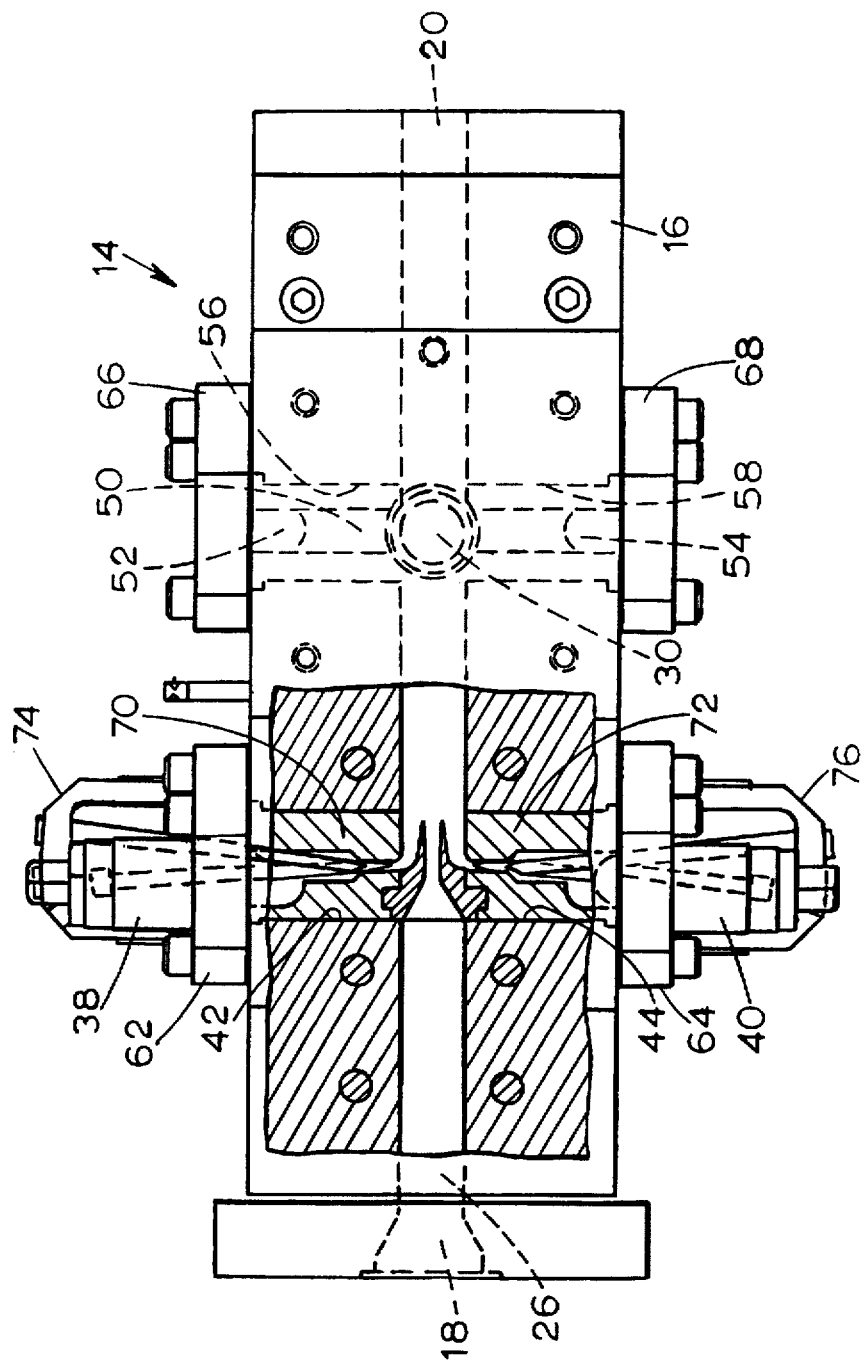
FIG. 2 comprises a side elevational view, with a portion broken away to reveal components in section therein, of the feedblock of FIG. 1.
Figure 3:
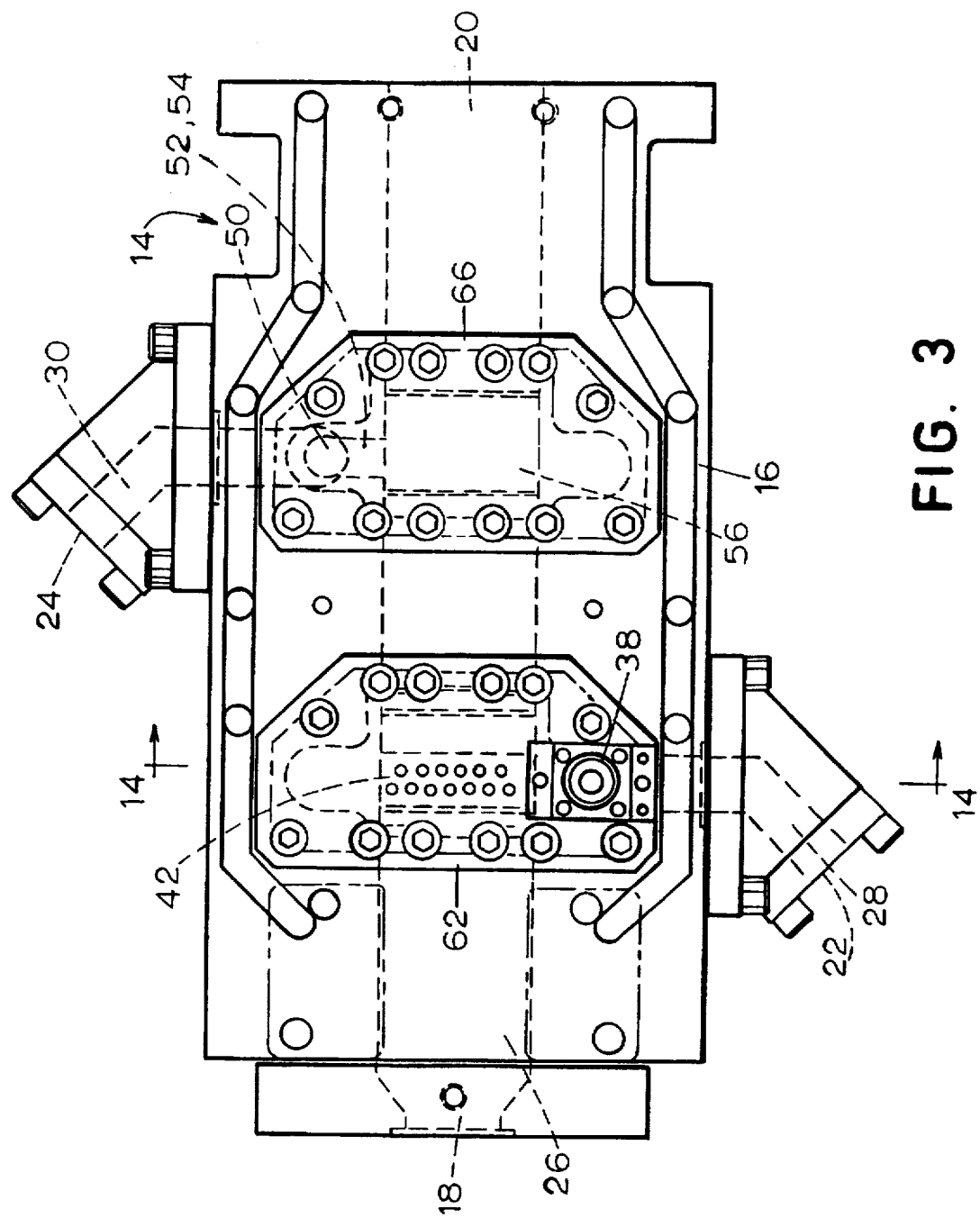
FIG. 3 comprises a plan view of the feedblock of FIG. 2 with the flow tuning valve assembly 76 removed therefrom.
Figure 14:
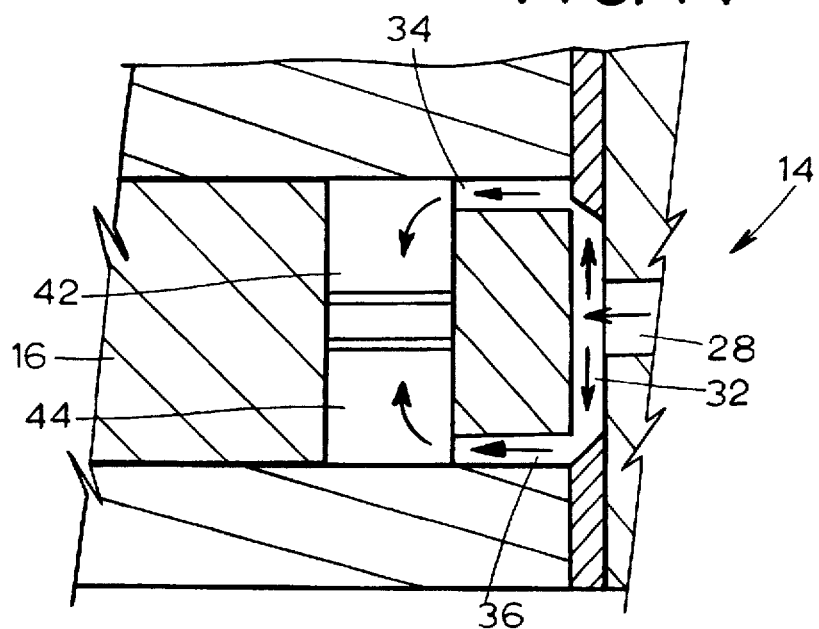
FIG. 14 is a fragmentary, sectional, diagrammatic view taken generally along the lines 14—14 of FIG. 3.
Figure 13:
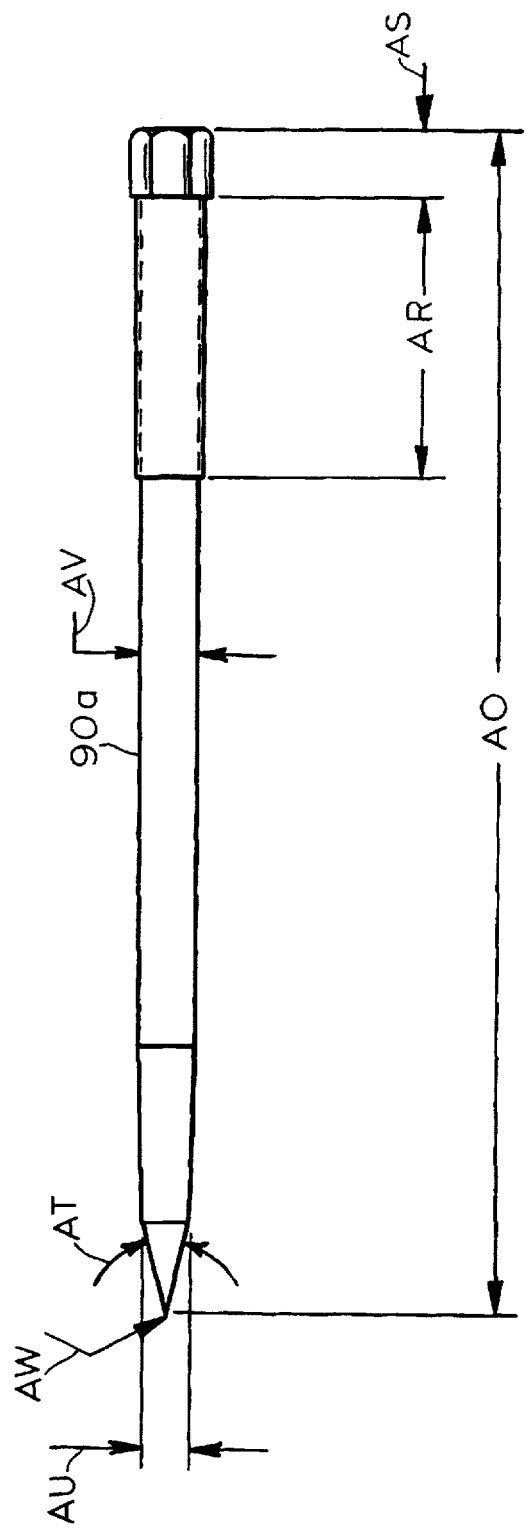
FIG. 13 is a side elevational view of one of the valve rods of FIG. 6.

FIGS. 2 and 3 illustrate the feedblock 14 in greater detail. The feedblock 14 comprises a main body 16, a main inlet 18, an outlet 20 and first and second auxiliary inlets 22, 24, respectively. A main passage 26 extends between the main inlet 18 and the outlet 20. As seen specifically in FIG. 3. each auxiliary inlet 22, 24 is in fluid communication with an associated auxiliary inlet passage 28, 30, respectively. Referring also to FIG. 14, the auxiliary inlet passage 28 is in fluid communication with a midpoint of a transverse passage 32 having ends which are in fluid communication with upper and lower branch passages 34, 36, respectively. The branch passages 34 and 36 are preferably perpendicular to the transverse passage 32. Thermoplastic flowing into the auxiliary inlet 22 flows through the auxiliary inlet passage 28 into the transverse passage 32 and into the branch passages 34 and 36. First and second optional valves 38, 40 are provided to control the flow rate of thermoplastic in the branch passages 34 and 36, respectively. Each branch passage 34, 36 terminates at an insert recess 42, 44, respectively. As seen in FIGS. 2 and 3, the auxiliary inlet passage 30, in like fashion, is in fluid communication with a transverse passage 50, first and second branch passages 52, 54 and insert recesses 56, 58. If thermoplastic is to be introduced through the auxiliary inlet 24, then valves (not shown) like the valves 38 and 40 would be provided at locations to control flow through the branch passages 52 and 54. It should be noted in this regard that the feedblock 14 as illustrated in the figures is configured to join flows through the main inlet 18 and the auxiliary inlet 22, and hence further description of the die will be made on the assumption that a layer of thermoplastic entering the auxiliary inlet 22 will coat one or both sides of a main thermoplastic flow entering the feedblock at the main inlet 18 and traveling through the main passage 26. Of course, the feedblock 14 can be configured so that one or both sides of the flow in the main passage 26 are coated by material flowing into the auxiliary inlet 24, as should be evident.

Disposed over each insert recess 42, 44, 56, 58 is a cover plate 62, 64, 66, 68, respectively, each of which is secured to the main body 16 of the feedblock 14 by bolts or other fastening devices. In the illustrated embodiment, identical flow insert assemblies 70 and 72 are disposed in the insert recesses 42 and 44, respectively. Also in the illustrated embodiment, identical flow tuning valve assemblies 74, 76 (FIG. 2) are mounted on and extend through bores or holes in the cover plates 62 and 64, respectively.

If thermoplastic is to be extruded into the auxiliary inlet 24 for application of one or both sides of the flow in the main passage 26, then a flow insert assembly may be provided in either or both of the recesses 56, 58 and one or more flow tuning valve assemblies may be mounted on and extend through holes in the cover plates 66 and/or 68. If thermoplastic is not to be extruded into the auxiliary inlet 24, no flow insert assemblies or flow tuning assemblies would be supplied and blank cover plates (i.e., plates with no holes for the valve assemblies) would be provided to seal the recesses 56, 58.

Figure 4:
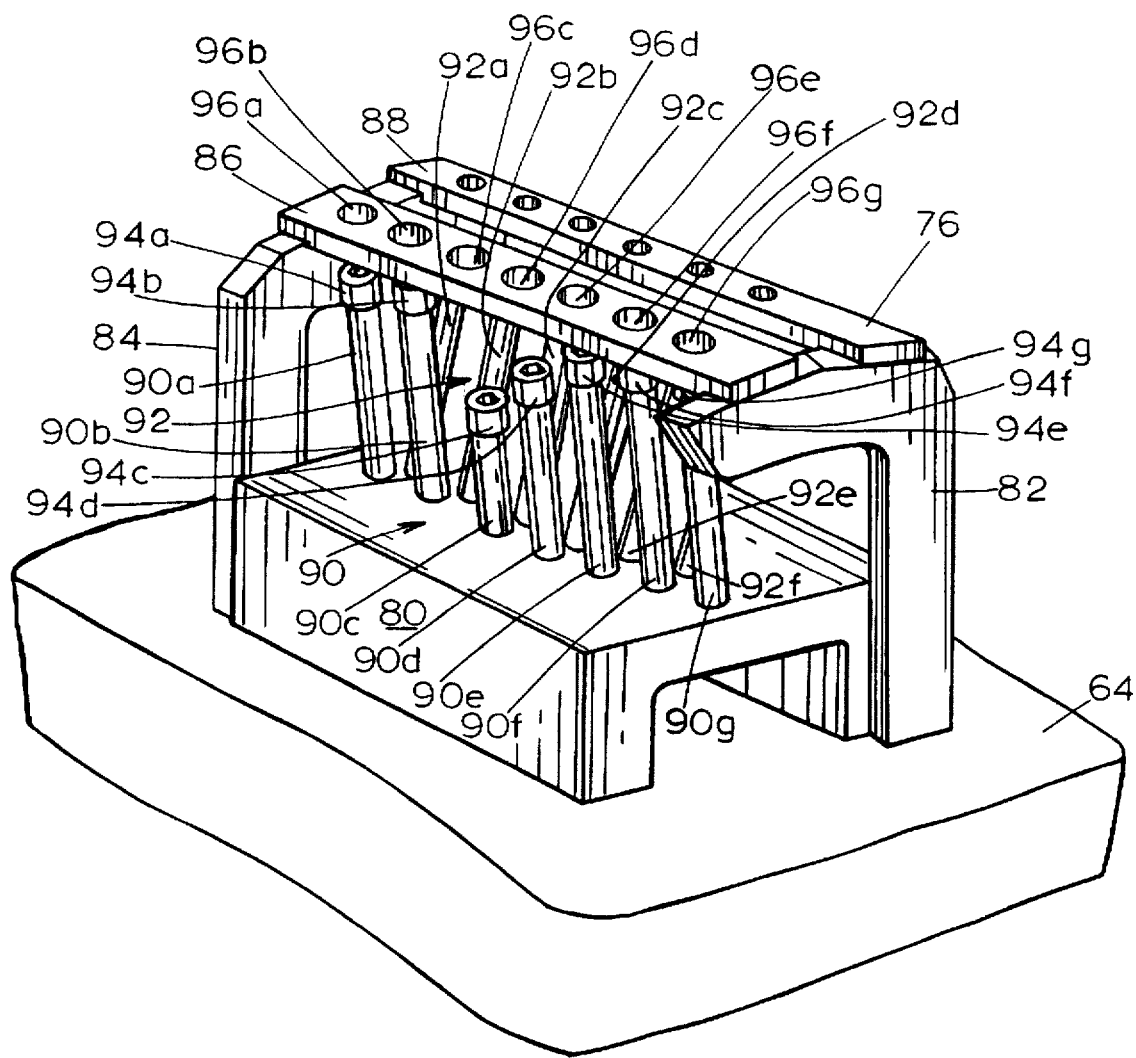
FIG. 4 comprises a perspective view of the flow tuning valve assembly 76 of FIG. 2.
Figure 5:
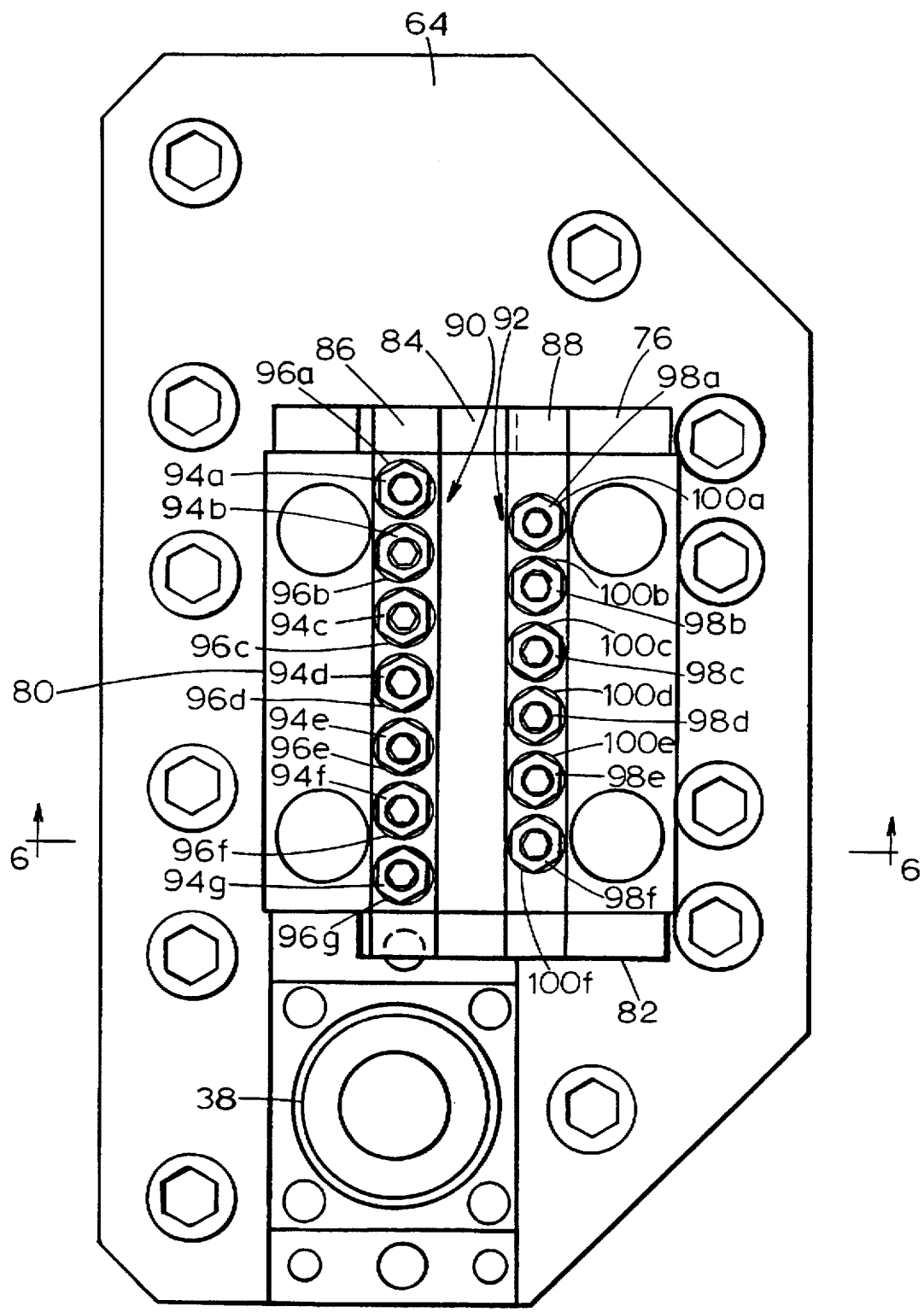
FIG. 5 is a plan view of the flow tuning valve assembly 76 of FIG. 4.
Figure 6:
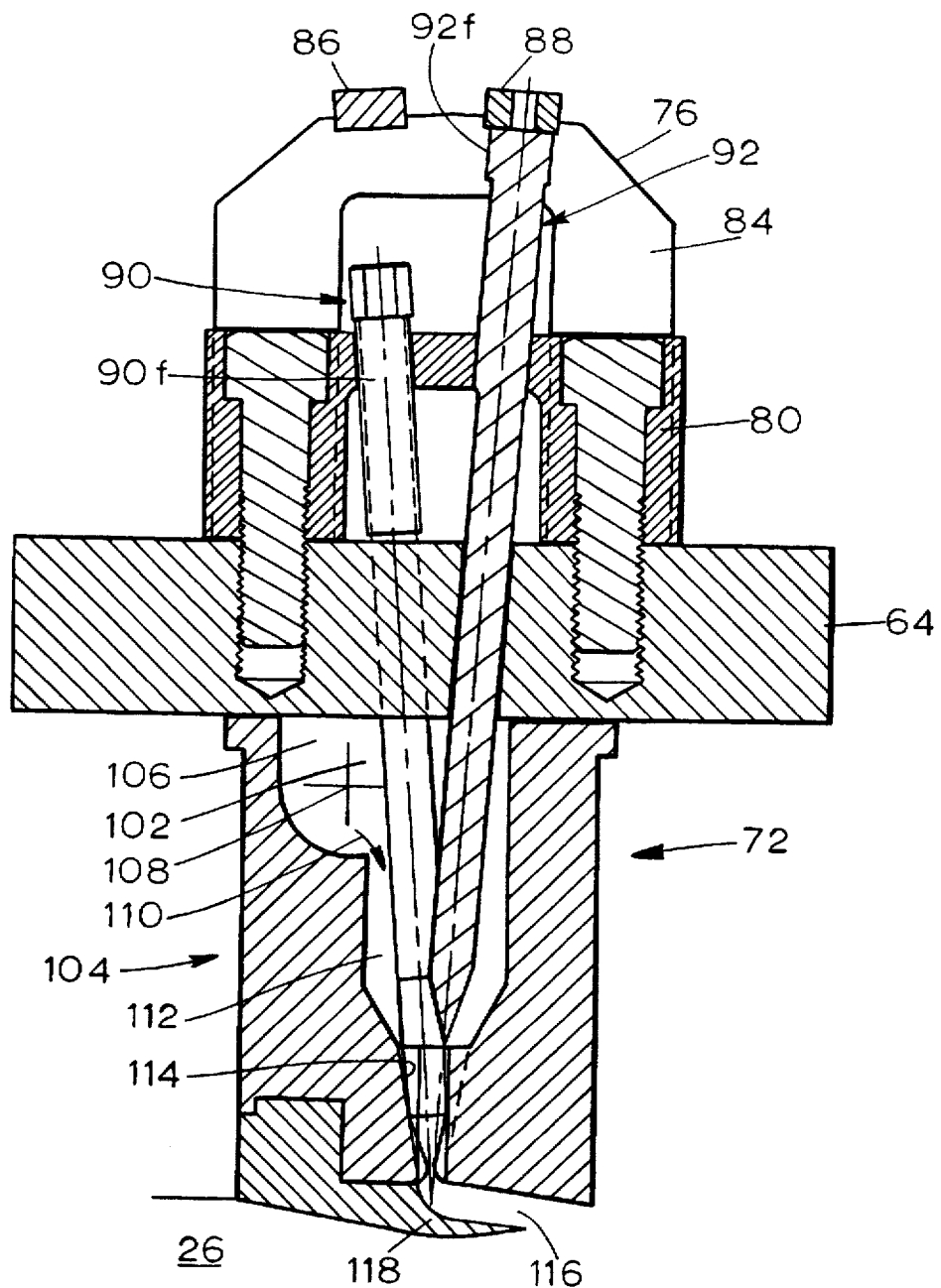
FIG. 6 is a sectional view taken generally along the lines 6—6 of FIG. 5.

Referring to FIGS. 4–6, the valve assembly 76 includes a valve guide block 80, first and second side brackets 82, 84 and first and second stop plates 86, 88. The stop plates 86, 88 may be welded or otherwise secured to the side brackets 82, 84 and the latter may be secured by suitable fasteners, such as bolts, to the valve guide block 80. The valve guide block 80 may, in turn, be bolted or otherwise secured to the cover plate 64.

As seen in the illustrated embodiment, the side brackets 82 and 84 are not identical in the sense that the side bracket 82 has one upstanding leg whereas the side bracket 84 has two upstanding legs. The absence of a second leg on the side bracket 82 provides clearance for the valve 38. Of course, the particular shape and construction of the side brackets are not critical, and in fact the side brackets 82, 84 may be identical to one another and/or may be of shapes other than those shown in the FIGS.

First and second sets 90, 92 of flow tuning valves extend through the valve guide block 80 and the cover plate 64 into the insert recess 44. Specifically, valve rods 90a–90g are each threaded about an outer surface thereof and extend through respective threaded bores in the valve guide block 80 and each valve rod 90a–90g includes a socketed hex head 94a–94g, respectively, each adapted to be engaged by an Allen wrench or other turning tool to adjust the axial position of the respective valve rod 90a–90g within the respective bore of the valve guide block 80. The stop plate 86 limits outward travel of the valve rods 90a–90g while still permitting access of an Allen wrench through holes 96a–96g.

In like fashion, valve rods 96a–96f include threaded outer surfaces which extend through threaded bores in the valve guide block 80. As with the valve rods 90a–90g, each of the valve rods 96a–96f includes a socketed hex head 98a–98f which is adapted to be engaged by a suitable turning tool, such as an Allen wrench, and holes 100a–100g extend through the stop plate 88 and are aligned with the socketed hex heads 98a–98f, respectively, and permit access thereto. The stop plate 88, like the stop plate 86, prevents the valve rods 96a–96f from being fully removed from the bores in the valve guide block 80.

Referring now FIGS. 6–12 and 15, the valve rods 90a–90g and 92a–92f are preferably identical to one another and each extends into an insert recess 102 defined by a flow tuning portion 104. Thermoplastic flow enters a channel 106 substantially coincident with a centerline 108 of the branch passage 36 and travels in the direction of the arrow 110 into a receiving well 112. The receiving well 112 is in fluid communication with a flow tuning channel 114 which, in turn, is in fluid communication with a convergence channel 116 defined by a nose piece or portion 118 of the flow insert assembly 72. The convergence channel 116 converges with the main passage 26 at a series of convergence points that together define a convergence area.

It should be noted that the particular configurations (i.e., sizes and shapes) of the receiving well 112, the flow tuning channel 114 and the convergence channel 116 may be different from those shown and still fall within the scope of the present invention. For example, the receiving well 112 may be longer or shorter from top to bottom and/or be disposed at an angle of other than 90° with respect to the flow through the main passage 26 as seen in FIG. 6, the channels 114 and/or 116 may be longer or shorter, etc . . . .

As seen specifically in FIGS. 7–12 and 15, the flow tuning channel 114 comprises first and second series of intercommunicating holes 120a–120g and 122a–122f, respectively. The holes 120a–120g and 122a–122f are preferably interspersed such that the hole 122a is between the holes 120a and 120b, the hole 120b is between the holes 122a and 122b, and so on. Still further in accordance with the preferred embodiment, and as noted in greater detail below, adjacent holes overlap or otherwise intercommunicate for at least a portion of the length thereof so that there is no wall or other intervening structure therebetween at such portion. Also, preferably, each hole 120a–120g and 122a–122f is tapered such that the hole becomes smaller as the convergence channel 116 is approached. Still further, the taper of each hole 120a–120g and 122a–122f is uniform over the length thereof, although the taper may be nonlinear, if desired.

Figure 15:
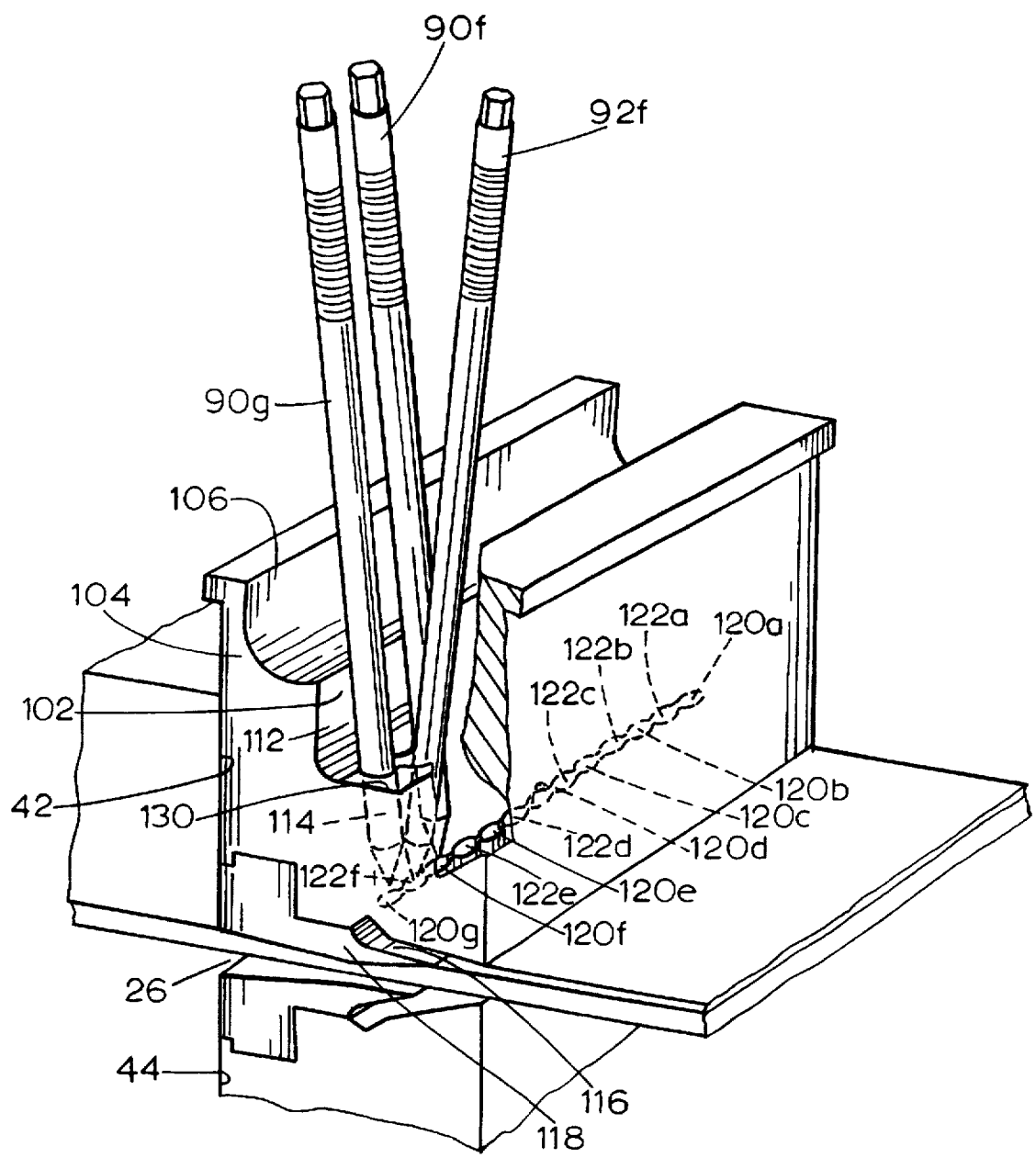
FIG. 15 is a fragmentary, exploded, perspective view of a portion of the flow tuning valve assembly 76 of FIG. 4.

As seen in FIGS. 6 and 15, the valve rods 90a–90g and the valve rods 92a–92f are disposed at equal and opposite angles with respect to a vertical line and centerlines of the valve rods 90a–90g and 92a–92f are aligned with centerlines of the holes 120a–120g and 122a–122f, respectively.

Preferably, each of the valve rods 90a–90g and 92a–92f is smaller than and may be selectively extended a desired amount into the respective hole 120a–120g and 122a–122f, respectively, to vary the flow resistance therein. The valve rods 90 and the holes are inclined relative to the valve rods 92 and the holes 122 to provide enough space for all of the valve rods 90 and 92 and to permit ready adjustment of same. Further, the holes 120 and 122 are preferably (although not necessarily) tapered throughout their length to maintain the hole overlap for at least a portion of the distance through the flow tuning portion 104 so that there is no wall or intervening structure therebetween which could lead to the creation of weld lines or beads in the finished product.

Still further, each valve rod 90, 92 preferably, although not necessarily, has a cross-sectional size which closes off the respective hole 120, 122 when the valve rod is extended into such hole by a particular amount. Alternatively, each valve rod 90, 92 may be smaller than the respective hole 120, 122 over the full length thereof.

Figure 7:
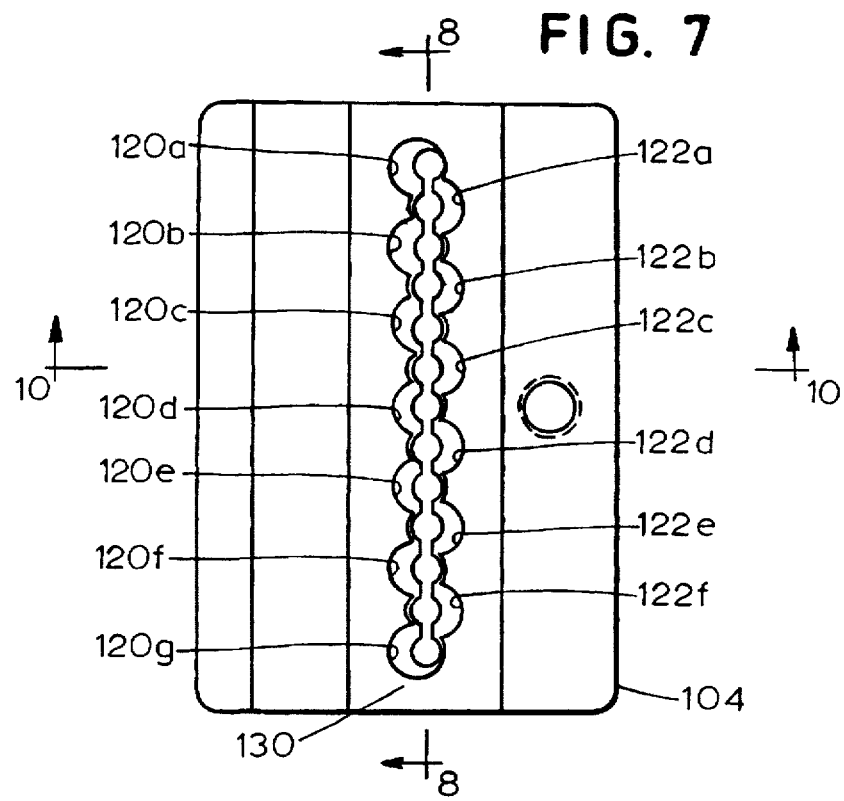
FIG. 7 is a plan view of the flow insert assembly 72 of FIG. 6.
Figure 8:
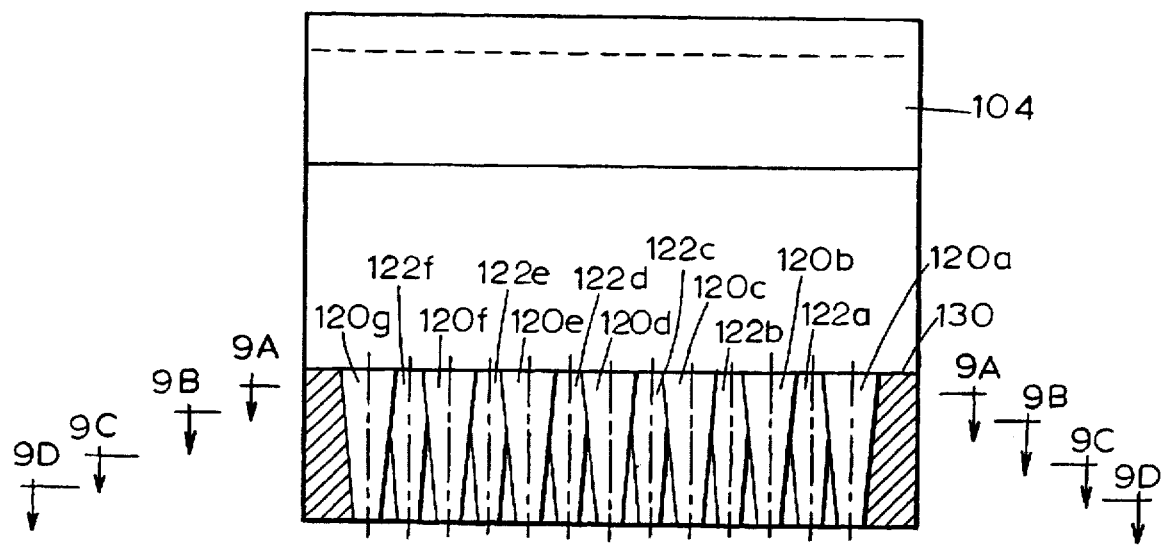
FIGS. 8 and 10 are sectional views taken generally along the lines 8—8 and 10—10, respectively, of FIG. 7.
Figure 9A:
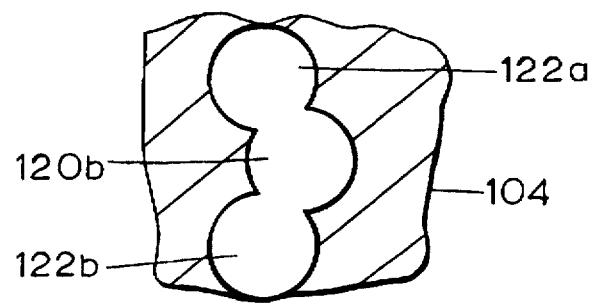
FIGS. 9A, 9B, 9C and 9D are sectional views taken generally along the lines 9A—9A, 9B—9B, 9C—9C and 9D—9D, respectively, of FIG. 8.
Figure 9B:
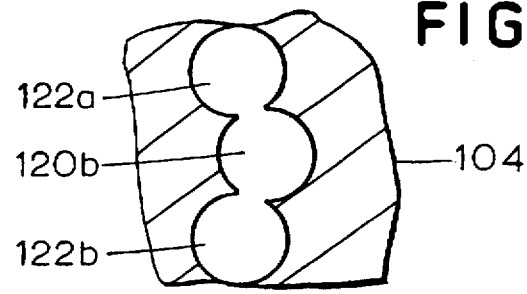
Figure 9C:
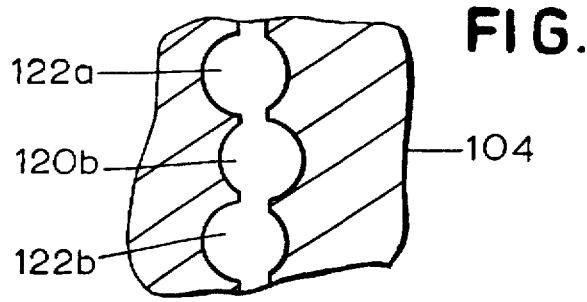
Figure 9D:
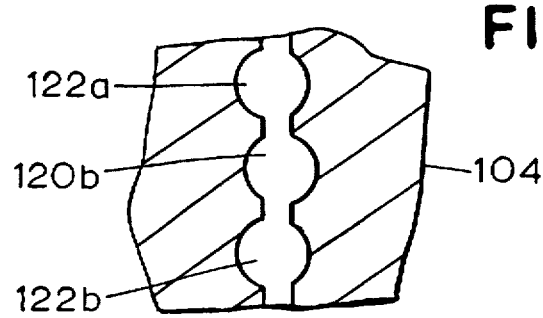
Figure 10:
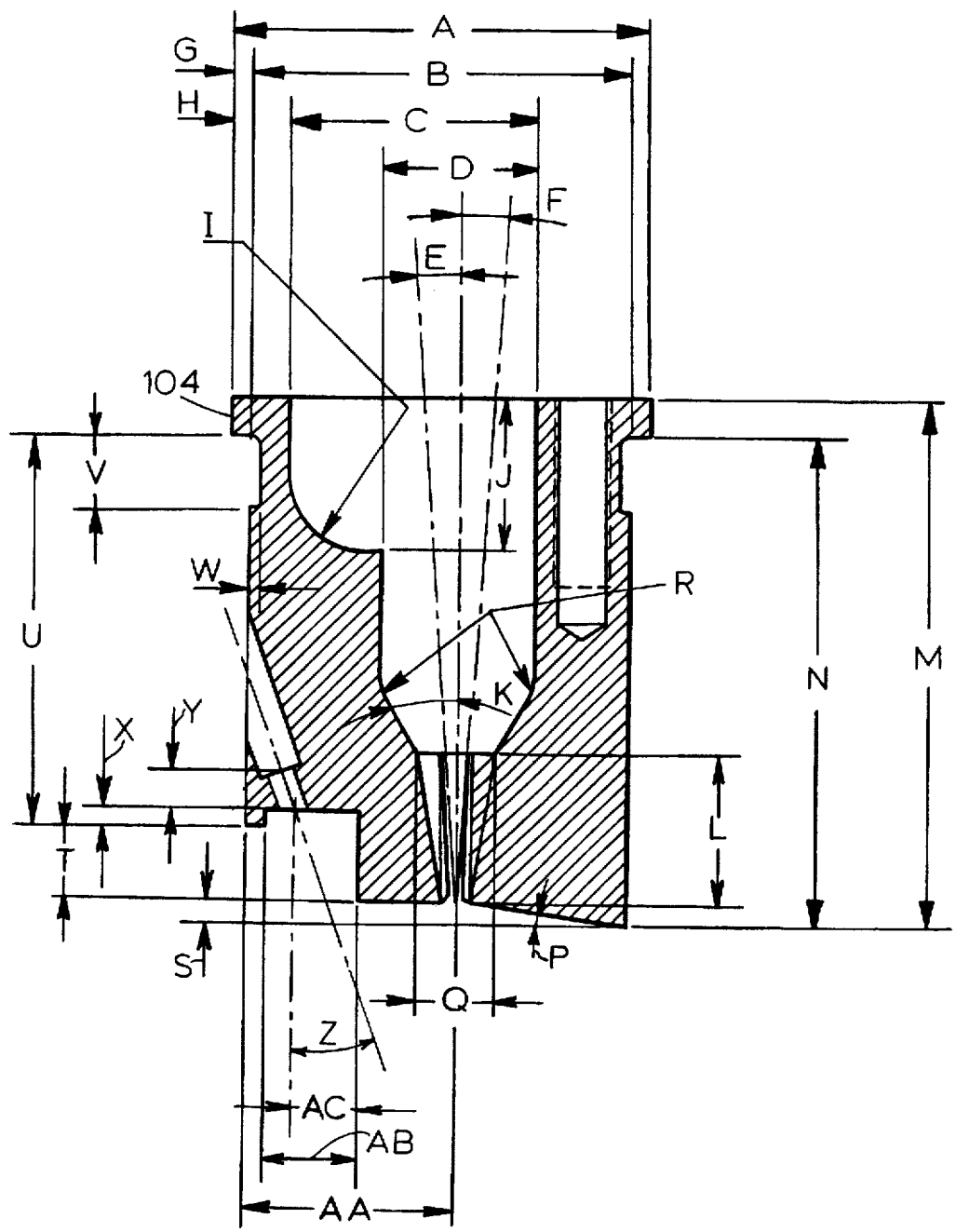
Figure 11:
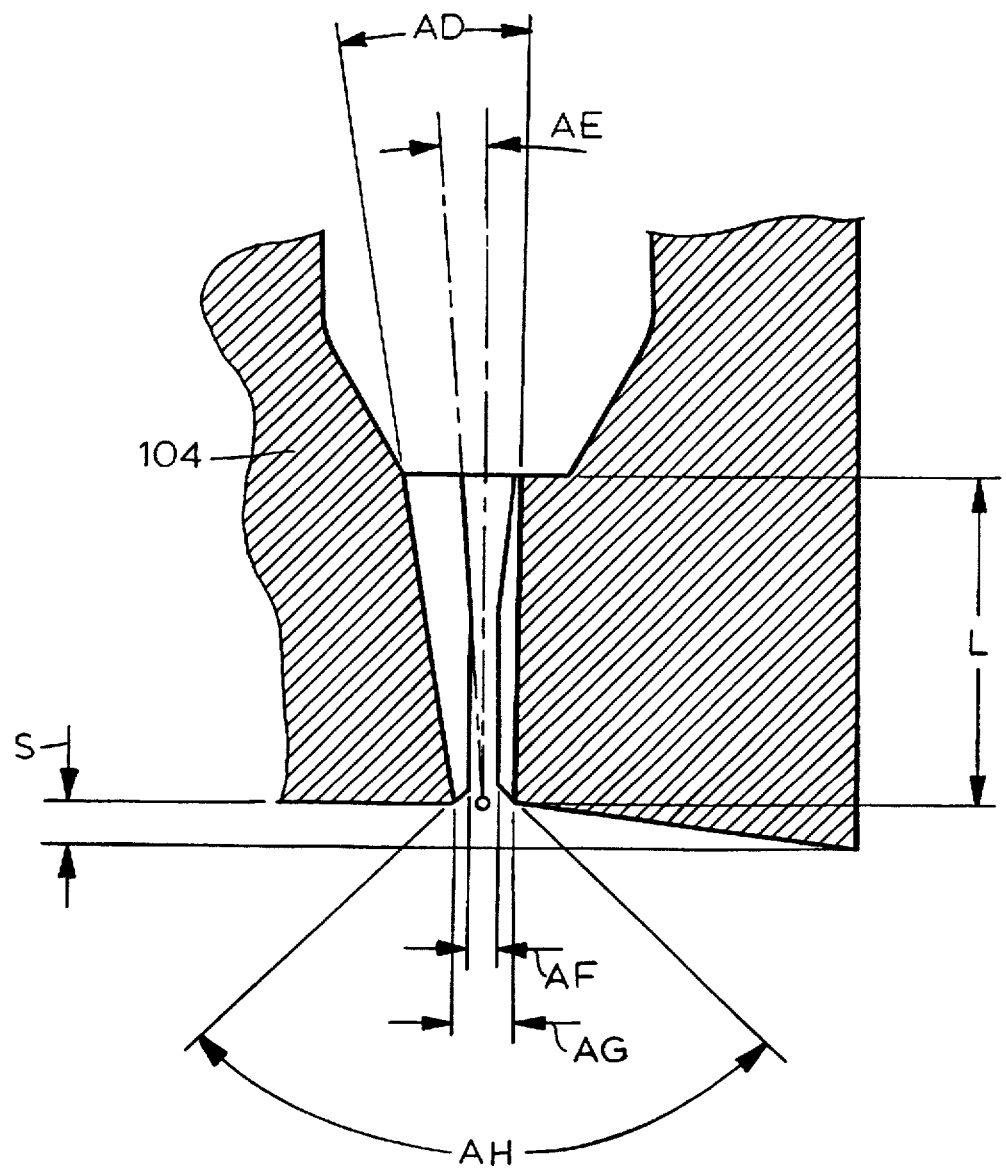
FIG. 11 is an enlarged, fragmentary, sectional view of the flow tuning portion 104 of FIG. 10.
Figure 12:
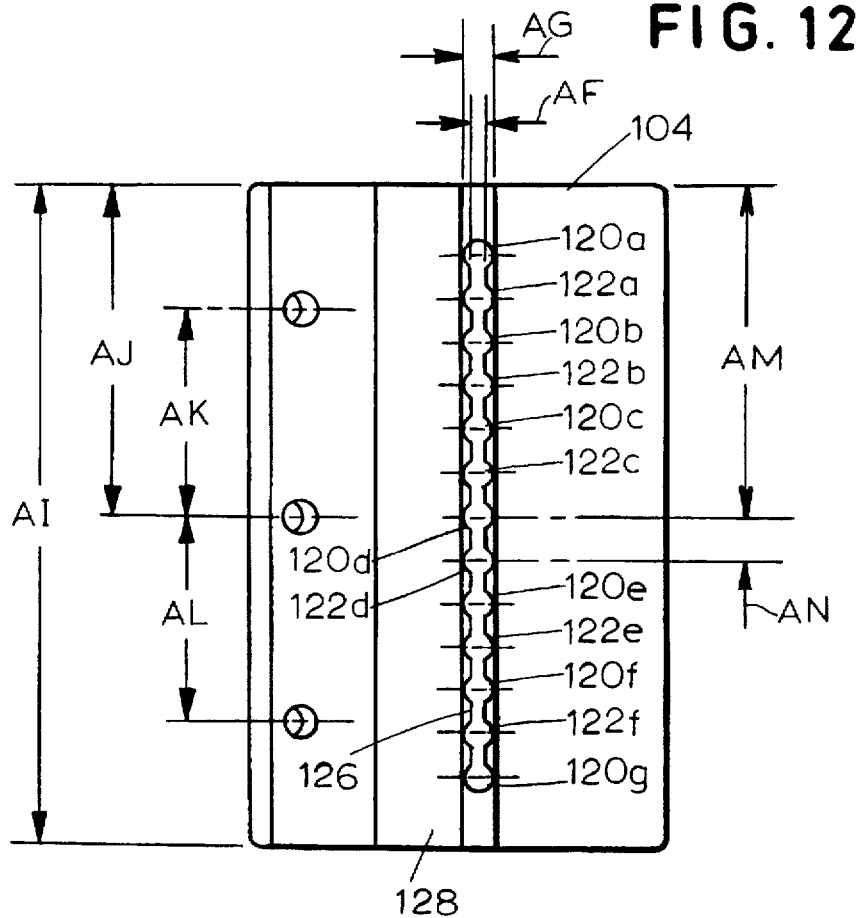
FIG. 12 is a bottom view of the flow tuning portion 104 of FIGS. 7 and 10.

Referring to FIGS. 7, 9 and 12, and as noted above, the holes 120, 122 may overlap only over a portion of the full length thereof so that each valve rod 90, 92 can completely shut off the flow of extrudate therethrough. In this event, in order to eliminate weld lines in the finished product, one or more slots or channels 126 may be cut, milled or otherwise formed in a bottom surface 128 of the flow tuning portion 104 to join the holes 120, 122. Alternatively, the holes 120, 122 may overlap over the full length thereof so that no slot(s) or channel(s) need be formed. Alternatively, if desired, the holes 120, 122 need not overlap at all; in this case intercommunication between the holes 120, 122 may be afforded by one or more slots or channels extending between the holes and formed over the entire length thereof.

FIGS. 9A–9D illustrate sections taken at successive equal distances from a surface 130 (FIGS. 7 and 15) of the flow tuning portion 104. Preferably, the flow tuning portion 104 is one inch in depth at the surface 130 and the sections illustrated in FIGS. 9A, 9B, 9C and 9D are taken at 0.2 inches, 0.4 inches, 0.6 inches and 0.8 inches from the surface 130.

FIGS. 10–13 illustrate sample dimensions for the flow tuning portion 104 and each of the valve rods 90 and 92, it being understood that the dimensions are merely exemplary and may be modified and still obtain the unique advantages afforded by the present invention (all dimensions are inches except as otherwise noted).

| REFERENCE LETTER | DIMENSIONS |
|---|---|
| A | 2.750 |
| B | 2.492 |
| C | 1.625 |
| D | 1.000 |
| E | 4° |
| F | 4° |
| G | 0.129 |

-continued

| REFERENCE LETTER | DIMENSIONS |
|---|---|
| H | 0.375 |
| I | 0.50 radius |
| J | 1.000 |
| K | 30° |
| L | 1.000 |
| M | 3.500 |
| N | 3.250 |
| P | 8° |
| Q | 0.500 |
| R | 0.25 radius |
| S | 0.140 |
| T | 0.485 |
| U | 2.625 |
| V | 0.500 |
| W | 0.070 |
| X | 0.125 |
| Y | 0.250 |
| Z | 20° |
| AA | 1.375 |
| AB | 0.625 |
| AC | 0.437 |
| AD | 10° |
| AE | 2° |
| AF | 0.090 |
| AG | 0.179–0.183 |
| AH | 90° |
| AI | 3.992 |
| AJ | 1.997 |
| AK | 1.25 |
| AL | 1.25 |
| AM | 1.996 |
| AN | 0.2634 |
| AO | 6.625 |
| AR | 1.562 |
| AS | 1.375 |
| AT | 30° |
| AU | 0.2679 |
| AV | 0.320–0.321 diameter |
| AW | 0.005 radius |

The present invention permits profile adjustment of a cap layer overlaying a main layer across the width of thermoplastic flowing through the feedblock 14. This adjustment is accomplished without the production of weld lines, merely by adjusting individual ones of the valve rods 90 and 92 to obtain a change in localized flow distribution across the width of the main flow. The sensitivity to changes in flow profile can be changed by changing the size and/or shape of each valve rod and/or each hole 120 or 122, either locally or along the entire length thereof.

If desired, a suitably-profiled cap layer can be added by the valve assembly 74 and the insert assembly 70 adjacent a further convergence channel on the other side of the main flow opposite the cap layer produced adjacent the convergence channel 116.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

I claim:

1. A feedblock, comprising:

a main passage having a length extending from a first inlet toward an outlet and a width transverse to the length;

a plurality of intercommunicating auxiliary passages converging with the main passage on one side of the main passage at a series of openings arranged across the width of the main passage, the auxiliary passages intercommunicating over at least a portion of their lengths from the openings to upstream of the openings; and flow adjustment apparatus disposed in the auxiliary passages for controlling flow of a material therethrough;

wherein each auxiliary passage is defined by associated passage walls substantially fully surrounding an associated auxiliary flow of material therethrough.

2. The feedblock of claim 1, wherein the flow adjustment apparatus comprises a plurality of valve rods each disposed in an associated one of said auxiliary passages and axially movable to change flow resistance therein.

3. The feedblock of claim 2, wherein each valve rod has a cross-sectional configuration matching a cross-sectional configuration of the respective auxiliary passage.

4. The feedblock of claim 2, wherein each valve rod and each auxiliary passage is circular in cross section.

5. The feedblock of claim 2, wherein each valve rod has a cross-sectional size smaller than a cross-sectional size of the associated auxiliary passage.

6. The feedblock of claim 2, wherein each valve rod is tapered.

7. The feedblock of claim 1, wherein the auxiliary passages overlap over a full length thereof.

8. The feedblock of claim 1, wherein the auxiliary passages overlap over a portion of a full length thereof and further including a slot interconnecting the auxiliary passages.

9. The feedblock of claim 1, wherein a slot interconnects the auxiliary passages over a full length thereof.

10. The feedblock of claim 1, wherein the auxiliary passages are tapered.

11. A feedblock, comprising:

a main passage having a length extending from a first inlet toward an outlet and a width transverse to the length;

a plurality of intercommunicating auxiliary passages converging with the main passage on one side of the main passage at a series of openings arranged across the width of the main passage; and flow adjustment apparatus disposed in the auxiliary passages for controlling flow of a material therethrough;

wherein the auxiliary passages are inclined relative to one another.

12. A feedblock, comprising:

a first passage extending toward an outlet;

a second passage converging with the first passage at a first convergence point on one side of the first passage;

a third passage intercommunicating with the second passage and converging with the first passage at a second convergence point on the one side of the first passage laterally offset from the first convergence point, the second and third passages intercommunicating over at least a portion of their lengths from the convergence points to upstream of the convergence points; and first and second valve rods disposed in the second and third passages, respectively, at least one of the valve rods being movable in the respective passage to change flow resistance therein and wherein each second and third passage is defined by walls spaced from an associated one of the valve rods such that a space for material flow completely surrounds each rod.

13. The feedblock of claim 12, wherein the first and second valve rods have cross-sectional configurations matching cross-sectional configurations of the second and third passages, respectively.

14. The feedblock of claim 12, wherein each valve rod and each of the second and third passages is circular in cross section.

15. The feedblock of claim 12, wherein the first and second valve rods are axially displaceable in the second and third passages, respectively.

16. The feedblock of claim 12, wherein each valve rod is tapered.

17. The feedblock of claim 12, wherein each of the first and second valve rods has a cross-sectional size smaller than a cross-sectional size of each of the second and third passages, respectively.

18. The feedblock of claim 12, wherein the second and third passages are tapered.

19. A feedblock comprising:

a first passage extending toward an outlet;

a second passage converging with the first passage at a first convergence point on one side of the first passage;

a third passage overlapping with the second passage and converging with the first passage at a second convergence point on the one side of the first passage laterally offset from the first convergence point; and first and second valve rods disposed in the second and third passages, respectively, at least one of the valve rods being movable in the respective passage to change flow resistance therein;

wherein the second and third passages are inclined relative to one another.

20. The feedblock of claim 12, wherein the second and third passages overlap over a full length thereof.

21. The feedblock of claim 12, wherein the second and third passages overlap over a portion of a full length thereof and further including a channel extending between the second and third passages where such passages do not overlap.

22. A feedblock, comprising:

a main passage extending toward an outlet and having a width;

a set of intercommunicating auxiliary passages converging with the main passage at a convergence area on one side of the main passage wherein each auxiliary passage is round in cross-section and has a length and wherein the auxiliary passages intercommunicate over at least a portion of the lengths thereof from the convergence area to upstream of the convergence area; and a set of movable valve rods disposed within the set of auxiliary passages, wherein the movable valve rods are adjustable to permit profile adjustment of an extrudate cap layer formed on a main layer of extrudate flowing in the main passage and wherein each valve rod is round in cross-section.

23. The feedblock of claim 22, wherein the auxiliary passages overlap.

24. The feedblock of claim 22, wherein the auxiliary passages overlap over a portion of a length thereof and a channel interconnects the auxiliary passages where such passages do not overlap.

25. The feedblock of claim 22, wherein a slot interconnects adjacent auxiliary passages over a full length thereof.

26. The feedblock of claim 22, wherein the auxiliary passages are tapered.

27. A feedblock comprising:

a main passage extending toward an outlet and having a width;

a set of intercommunicating auxiliary passages converging with the main passage at a convergence area on one side of the main passage; and a set of movable valve rods disposed within the set of auxiliary passages, wherein the movable valve rods are adjustable to permit profile adjustment of an extrudate cap layer formed on a main layer of extrudate flowing in the main passage;

wherein the auxiliary passages are divided into two sets and wherein the auxiliary passages of one set are interspersed with and inclined relative to the auxiliary passages of another set.

28. The feedblock of claim 27, wherein adjacent auxiliary passages overlap over a first portion of a full length thereof and a slot is formed between adjacent auxiliary passages at a second portion of the full length thereof between the first portion and the convergence area.

* * * * *